Jan. 25, 1966 D. E. KRUP 3,231,140
VALVE SYSTEM FOR DISPENSING LIQUID
Filed May 17, 1963 2 Sheets-Sheet 1
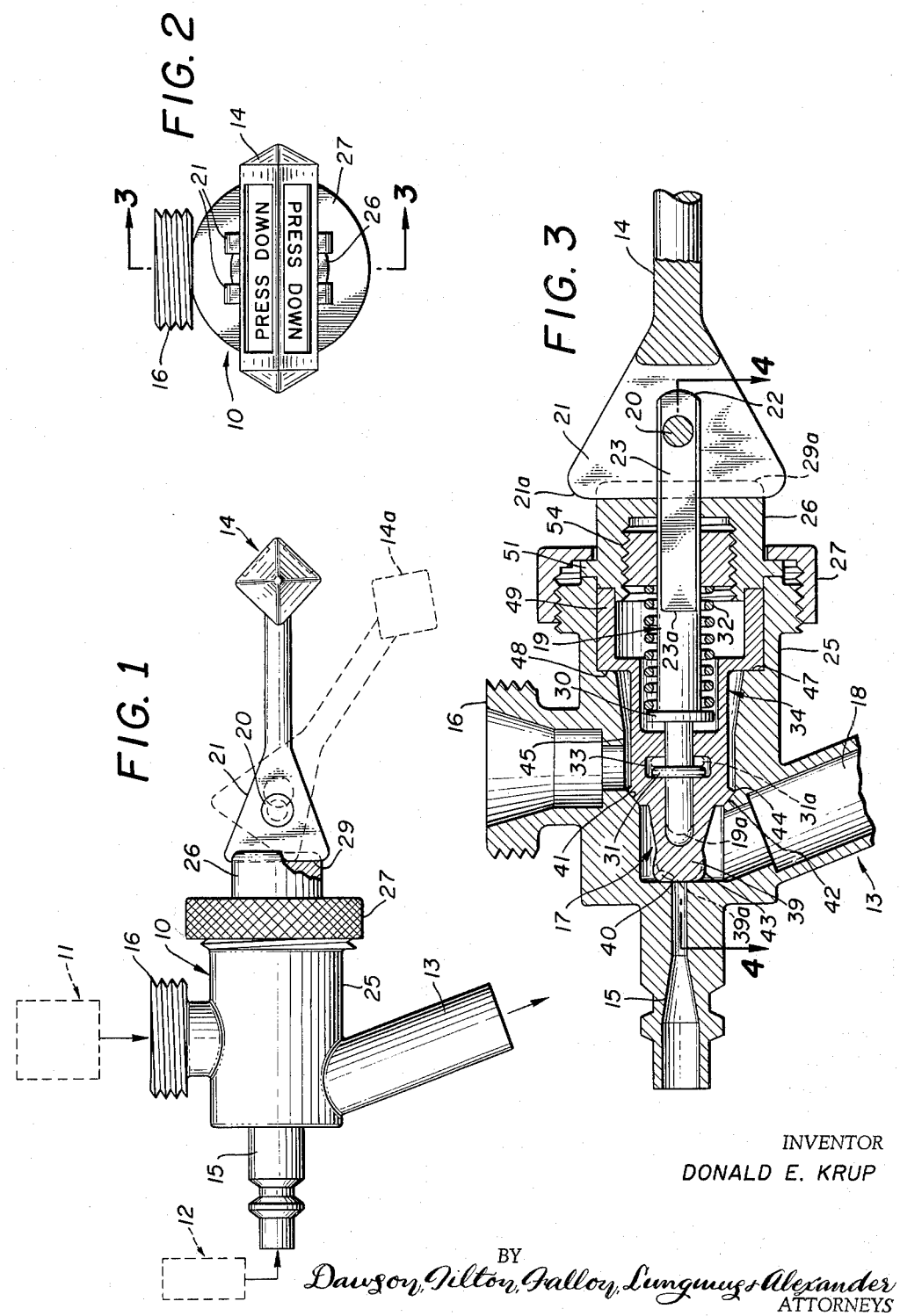
INVENTOR
DONALD E. KRUP Jan. 25, 1966     D. E. KRUP     3,231,140
VALVE SYSTEM FOR DISPENSING LIQUID
Filed May 17, 1963     2 Sheets-Sheet 2
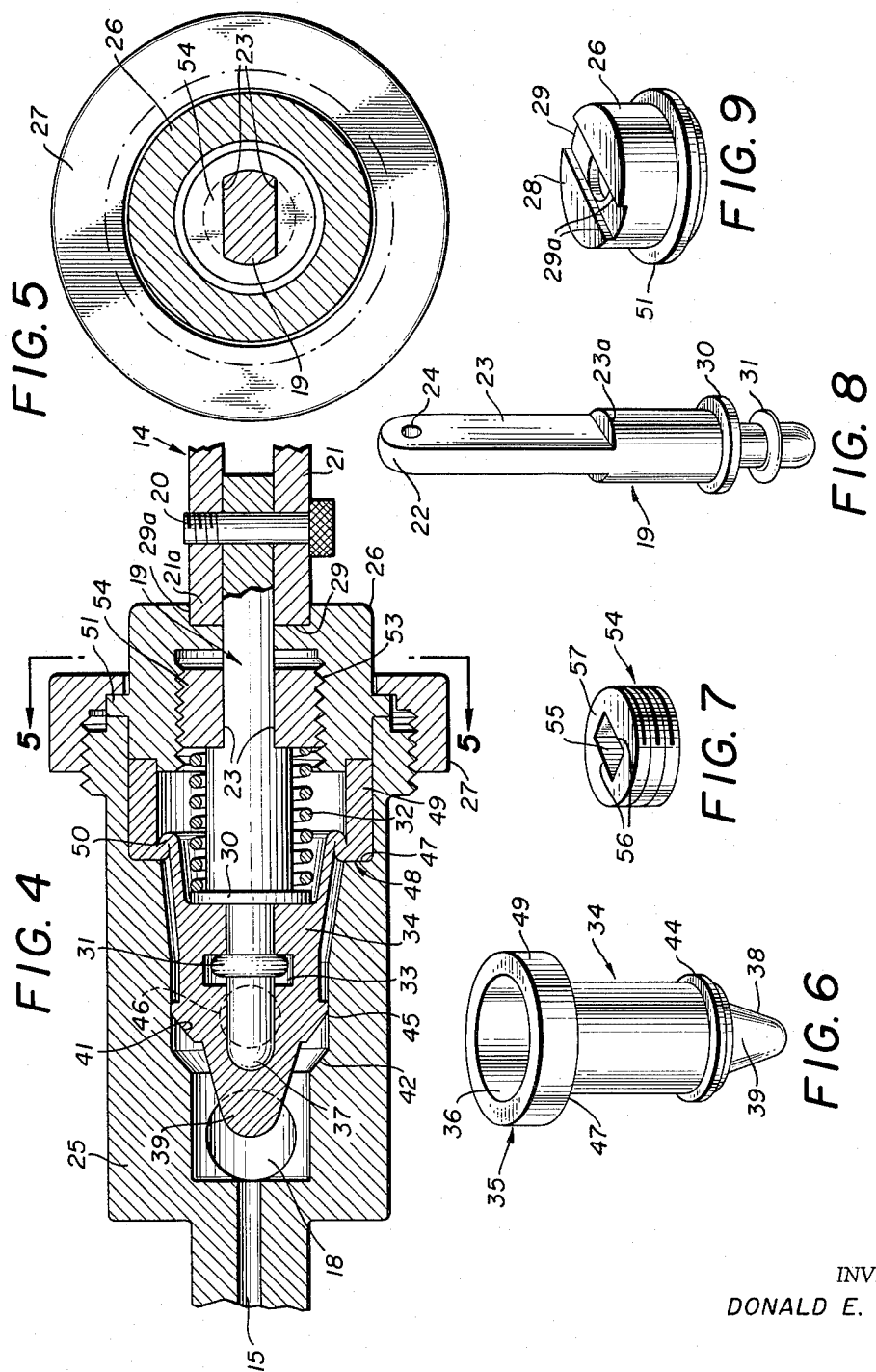
INVENTOR
DONALD E. KRUP
BY
Dawson, Tilton, Fallon, Lungmus & Alexander
ATTORNEYS United States Patent Office 3,231,140
Patented Jan. 25, 1966

3,231,140
VALVE SYSTEM FOR DISPENSING LIQUID
Donald E. Krup, Elgin, Ill., assignor to The Fred Mills Corporation, Winnetka, Ill., a corporation of Illinois
Filed May 17, 1963, Ser. No. 284,772
6 Claims. (Cl. 222—129.2)

This invention relates to a valve system for dispensing liquids and, more particularly, to a valve system wherein high pressure liquid diluent is mixed with a liquid concentrate.

The invention finds utility, for example, in connection with the vending of hot chocolate, wherein chocolate concentrate or viscous syrup is mixed in a casing with high pressure hot water and dispensed into a cup. A vexing problem that is present in this environment is the control of the amount of concentrate introduced into the mixing chamber. The consistency of the referred to concentrate, such as the chocolate syrup, usually varies from batch to batch. Further, the consistency varies with the temperature. Even though the concentrate container may be equipped with heating coils to maintain a predetermined temperature, some time may elapse before this occurs. For example, in the morning, the syrup may be quite viscous so that a very weak cup of hot chocolate will be dispensed. If the amount of concentrate entering the mixing chamber is not regulated throughout the course of the day, a very strong mixture may result after the unit has come up to temperature.

It is therefore an important object of this invention to provide a means for readily controlling the amount of liquid concentrate introduced into the mixing chamber of a dispensing valve. A generalized description of the valve system with which the instant invention is concerned can be found in the application of Donald E. Krup, Serial No. 61,554, filed October 10, 1960, now Patent No. 3,105,616, dated October 1, 1963. Reference may be had to the Krup disclosure for details of construction and operation not set forth herein.

Another object is to provide an improvement on the above-mentioned Krup application, particularly in the details of the dispensing valve.

Another object of the invention is to provide a unique means for controlling the flow rates of ingredients to be mixed, wherein the control is achieved without the need of taking the mixing valve apart. Here, it will be appreciated that external control of the flow rate of the chocolate syrup, for example, is desirable since restaurant personnel will not be called upon to deal with a complex valve. Further, externally positioned means for this control insure that there is no possibility of contaminating the food stuff.

Still another object is to provide a unique valve element in the environment described wherein a resilient cap-like member is subjected to differential stress so as to develop a superior seal against ingress of the high pressure liquid diluent. Other objects and advantages of the invention may be seen in the details of construction and operation set down in this specification.

The invention is explained in conjunction with an illustrated embodiment in the accompanying drawing, in which—

FIG. 1 is an elevational view of the inventive valve seen associated with the remainder of the mixing system, with the remainder of the system depicted schematically;

FIG. 2 is an operating end elevational view of the FIG. 1 valve;

FIG. 3 is a fragmentary enlarged sectional view taken along the sight line 3—3 of FIG. 2;

FIG. 4 is a fragmentary enlarged sectional view taken along the line 4—4 of FIG. 3;

FIG. 5 is a sectional view taken along the line 5—5 of FIG. 4;

FIG. 6 is a perspective view of the resilient valve sleeve seen in sectional view in the central portions of FIGS. 3 and 4;

FIG. 7 is a perspective view of a bushing provided in the interior of the valve and seen in sectional view in the right-hand central portions of FIGS. 3 and 4;

FIG. 8 is a perspective view of the valve stem or element disposed along the horizontal line of the valve, and again seen in the central portions of FIGS. 3 and 4; and FIG. 9 is a perspective view of the end closure of the valve seen in the right-hand portion of FIGS. 3 and 4.

The numeral 10 designates generally the inventive valve which is employed in conjunction with a vending machine (not shown), the machine supporting a source of liquid concentrate as at 11 in FIG. 1 and providing a source 12 of high pressure liquid diluent. In the case of hot chocolate issuing from the outlet nozzle 13 by virtue of rotating the handle 14 to the dotted line position designated 14a, hot water under pressure enters a first inlet 15 and chocolate concentrate enters a second inlet 16 to be mixed in the chamber 17 (see FIG. 3), after which it issues through the bore 18 of the nozzle outlet 13.

The operation of the valve 10 developed by pivoting the handle 14 to the dotted line position 14a can be appreciated from a consideration of FIGS. 3 and 4. In FIG. 3 the valve is closed, while in FIG. 4 the valve is open. Referring first to FIG. 3, it is seen that the numeral 19 designates generally the valve element or stem which is pivotally connected to the handle 14 by means of a crosspin 20. The handle 14 is bifurcated at one end, as at 21 (see FIG. 2), to receive the end 22 of the valve element 19. The valve element 19 is equipped with flats as at 23 so as to fit snugly but pivotally between the portions 21 of the handle 14. As seen in FIG. 8, the end 22 of the stem 19 is equipped with an opening as at 24 for the receipt of the pin 20. The valve 10 is equipped with a first body portion 25 (see FIG. 3) which receives a plug member 26, the portion 25 and the member 26 being releasably held together by means of an apertured cap 27. The plug member 26 can be seen in FIG. 9, and the outer face 28 is equipped with a slot 29 in which the handle portions 21 are received. Thus, in ordinary operation, the handle 14 is restricted to rocking in a single vertical plane, the end portions 21a being confined by the shoulders 29a developed by the slot 29. (See also FIGS. 3 and 4.)

The valve element 19, as best seen in FIG. 8, is equipped with a pair of annular flanges as at 30 and 31. The flange 30 serves to confine a coil spring 32 while the flange 31 fits within a cavity 33 provided in a resilient sleeve generally designated 34. The sleeve 34 can be seen in FIG. 6 and has a larger end, as at 35, providing an annular opening 36 which extends substantially throughout the length of the sleeve 34, terminating at 37 (see FIG. 4). The smaller end 38 of the sleeve 34 has a generally conical projection 39 which seats against the inner end 40 of the first inlet 15, thereby closing the passage 15 to flow of pressurized liquid, i.e., hot water.

In the fully closed position of the valve as seen in FIG. 3, the flange 31 is seen to be to the extreme left of the cavity 33. When the valve stem 19 moves to the left to the closing position, the beveled shoulder 41 first comes to bear against the conical seat 42 provided in the chamber 17. At this time, the flange 31 is in the dotted line position designated 31a in FIG. 3. Subsequent movement of the valve element 19 occurs because of the continued urging of the compression spring 32 against the larger annular flange 30, moving the valve element 19 further to the left and compressing the conical protuberance 39 to develop the bulged solid line configuration designated 43 in FIG. 3. The dotted line configuration 39a of the protuberance, the dotted line configuration 19a of the left-hand end of the valve stem 19, and the dotted line configuration 31a of the flange 31 all correspond to an intermediate position of the stem before the same has been urged to its maximum leftward position by the spring 32.

The supplemental compression just described of the protuberance 39 insures a secure seal with the seat 40 associated with the high pressure liquid inlet passage 15. A secure seal of the concentrate inlet passage 16 is provided by the co-action of the conical shoulder 41 with the conical seat 42. Further, the sleeve 34 is equipped with an annular bead as at 44 (see also FIG. 5), which develops a wiping action on the cylindrical inner face 45 of the chamber 17. This wiping action is seen also in FIG. 4, wherein the inlet port 46 associated with the inlet passage 16 is seen as a dotted circle.

The sleeve 34 is equipped with a further annular shoulder 47 which bears against an interior shoulder 48 provided within the body portion 25. The sleeve 34 is further equipped with a depending skirt 49 which, in combination with the shoulder 47, causes the sleeve 24 to roll back on itself, as at 50 in FIG. 4, when the stem 19 is retracted.

As can be seen from FIG. 4 in particular, the depending skirt 49 is confined between the shoulder 48 and the end cap 26 to seal the interior chamber of the valve 10, the end cap 26 in turn being removably secured in place by means of the apertured ring 27 bearing against the annular projecting flange 51 of the end cap 26.

The interior of the end cap 26 is threaded as at 53 and receives an externally threaded bushing 54—the latter being seen in perspective form in FIG. 7. The bushing 54 has a central bore as at 55 which is characterized by oppositely disposed flat side walls as at 56. The other opposite side walls, as at 57, of the bore 55 are rounded to conform to the periphery of the stem 19 (best seen in FIG. 8). Thus, the bushing is non-rotatably coupled to the stem 19 so that upon rotation of the stem 19 the bushing 54 moves either to the right or left in FIGS. 3 and 4. This movement changes the degree to which the spring 32 is compressed by means of stopping on the shoulder 23a against the flats on the bushing 54. Also, the position of the bushing defines the stroke of the stem 19, the end 23a of the flat 23 engaging the end of the bushing 54 as in FIG. 4.

To change the position of the bushing 54, the handle 14 is pulled to the right in FIG. 1 whereupon it is disengaged from the vertical slot 29. Thereafter, the handle 14 can be turned so as to move the bushing 54. In the morning, relative to a hot chocolate dispenser, when the concentrate is relatively viscous, the bushing 54 is moved to the right in FIG. 4 so as to create a greater opening for inflow of chocolate syrup, while after the syrup becomes less viscous (as from the heating element within the container 11), the handle can be rotated to decrease the stroke of the stem 19. Irrespective of the position of the bushing 54 and hence the degree to which the port 46 is exposed, the same amount of high pressure liquid diluent enters the inlet passage 15. It will also be noted that the first liquid entering the flow passage 15 is able to flow out of the outlet 18 and not flood the interior of the valve, i.e., the chamber 17, by virtue of the location of the outlet 18 longitudinally intermediate the flow passages 15 and 16.

While in the foregoing specification a detailed description of an embodiment of the invention has been set down for the purpose of explanation thereof, many variations in the details herein given may be made by those skilled in the art without departing from the spirit and scope of the invention.

I claim:

1. In liquid dispensing apparatus a dispenser casing providing a concentrate chamber having a concentrate inlet communicating with a source of liquid concentrate, said casing being also provided with a discharge outlet and a high velocity water jet inlet, a valve stem extending through said dispenser casing and equipped with spaced valves, one of said valves normally sealing the concentrate inlet and the other of said valves comprising a spreader head adapted, when closed, to seal said water inlet with both of said valves being operative to provide substantially simultaneous flow through said concentrate and water inlets, means for supplying water under pressure to said jet inlet, the outlet from said dispenser being normally open, a compression spring on said stem biasing said valves to sealing position, positionable bushing means rotatably mounted in said casing non-rotatably and slidably coupled to said stem for limiting the extent to which said stem is movable for opening said valves, and handle means on said stem external to said casing for selectively positioning said bushing and for opening said valve, said stem being equipped with a resilient sleeve defining said valves, said sleeve being equipped with an end projection engageable with said water inlet and an annular shoulder intermediate the sleeve ends for sealing said concentrate inlet, said projection being selectively compressible under the urging of said spring to seal said water inlet after said annular shoulder is in sealing position relative to said concentrate inlet.

2. In liquid dispensing apparatus a dispenser casing providing a concentrate chamber having a concentrate inlet communicating with a source of liquid concentrate, said casing being also provided with a discharge outlet and a high velocity water jet inlet, a valve stem extending through said dispenser casing and equipped with spaced valves, one of said valves normally sealing the concentrate inlet and the other of said valves comprising a spreader head adapted, when closed, to seal said water inlet with both of said valves being operative to provide substantially simultaneous flow through said concentrate and water inlets, means for supplying water under pressure to said jet inlet, the outlet from said dispenser being normally open, a resilient valve-providing sleeve on said stem, a generally conical projection on one end of said sleeve coaxially related to said stem for sealing said water inlet, a beveled annular shoulder on said sleeve intermediate the ends thereof for co-action with said body in sealing said concentrate inlet, said outlet communicating with said chamber immediately adjacent said water inlet, said sleeve being equipped with an internal cavity permitting compression of said projection in sealing said water inlet after said annular flange has sealed said concentrate inlet, a bushing threadably mounted within said casing and coupled to said stem for common rotation therewith, a coil spring interconnecting said stem and bushing normally biasing said stem to a position sealing said inlets, a handle pivotally connected to said stem external of said casing for selectively rotating said stem and bushing when said stem is moved to a position communicating both of said inlets with said concentrate chamber, and an end cap on said casing equipped with a bore, said stem extending through said bore, said end cap being equipped with slot means confining said stem against rotational movement whenever both of said inlets are sealed from said concentrate chamber.

3. In liquid dispensing apparatus, a source of liquid concentrate, a source of liquid, an elongated mixing valve casing equipped with a mixing chamber and having a pair of longitudinally spaced-apart inlets, one of said inlets being at an end of said casing and communicating with said liquid source, the other inlet being positioned intermediate the ends of said casing and communicating with said concentrate source, a valve stem in said casing chamber and equipped with spaced valves for simultaneously sealing said inlets, a resilient sleeve mounted on one end of said valve stem for simultaneously sealing said inlets, an internal cavity in said sleeve for additional stem movement relative to said inlets for compressing said sleeve in the portion thereof sealing the inlet communicating with said liquid source, bushing means slidably and non-rotatably mounted on said valve stem for controlling the stroke of said valve stem, said bushing being threadably received within said casing, and handle means on the other end of said valve stem for retracting said valve stem to expose said inlets, slot means on said casing operatively associated with said handle for normally confining said handle to movement retracting said valve stem.

4. A valve system for dispensing liquids, comprising an elongated body providing a mixing chamber, first and second inlets in said body communicating with said chamber, a source of liquid coupled to said first inlet, a source of pressurized liquid concentrate coupled to said second inlet, a liquid outlet in said body communicating with said chamber, said inlets being spaced longitudinally in said body with said outlet communicating with said chamber at a point intermediate said inlets, an elongated valve element assembly longitudinally movably mounted in said chamber and biased to urge one end of said assembly into covering relation with said first inlet, said element assembly including an elongated stem, one end of said stem being equipped with a cap constructed of resilient material whereby said stem is adapted to exert a compressive force on said cap in covering said first inlet, longitudinal movement of said assembly out of covering relation with said first inlet being adapted to develop a stream of pressurized liquid impinging on said assembly one end, a portion of said assembly intermediate the ends thereof isolating said second inlet from said mixing chamber, whereby both inlets are communicated with said mixing chamber by movement of said assembly, the other end of said assembly projecting externally of said body, a handle connected to said element assembly other end for moving said assembly to communicate both inlets with said mixing chamber, and means in said body coupled to said assembly for adjustably limiting the movement of said assembly.

5. The structure of claim 4 in which said cap is equipped with an elongated stem-receiving cavity, with said stem being received therein, an intermediate portion of said cavity being laterally enlarged, a flange on said stem intermediate the ends thereof and positioned in said laterally enlarged portion, said laterally enlarged portion having a dimension lengthwise of said assembly greater than the corresponding dimension of said flange.

6. The structure of claim 4 in which said means includes a bushing threadedly mounted in said body and having said stem extending therethrough, a flange on said stem spaced from said bushing, a spring extending between said flange and bushing to urge said stem against said first inlet, said bushing and stem being interconnected for common rotational movement, said handle being connected to said stem other end for pivotal movement in planes parallel to the length of said element, and slot means in said body receiving said handle and confining said pivotal movement to a predetermined one of said planes.

References Cited by the Examiner
UNITED STATES PATENTS

| | | | |
|---|---|---|---|
| 1,176,212 | 3/1916 | Fulton | 137—625.4 |
| 2,513,234 | 6/1950 | Cooper | 222—509 X |
| 2,578,544 | 12/1951 | Harr | 137—625.4 |

RAPHAEL M. LUPO, *Primary Examiner.*